Dec. 15, 1936.   W. DOYON   2,064,248
ELECTRIC HEATING ATTACHMENT FOR HOT WATER BAGS AND THE LIKE
Filed May 31, 1935
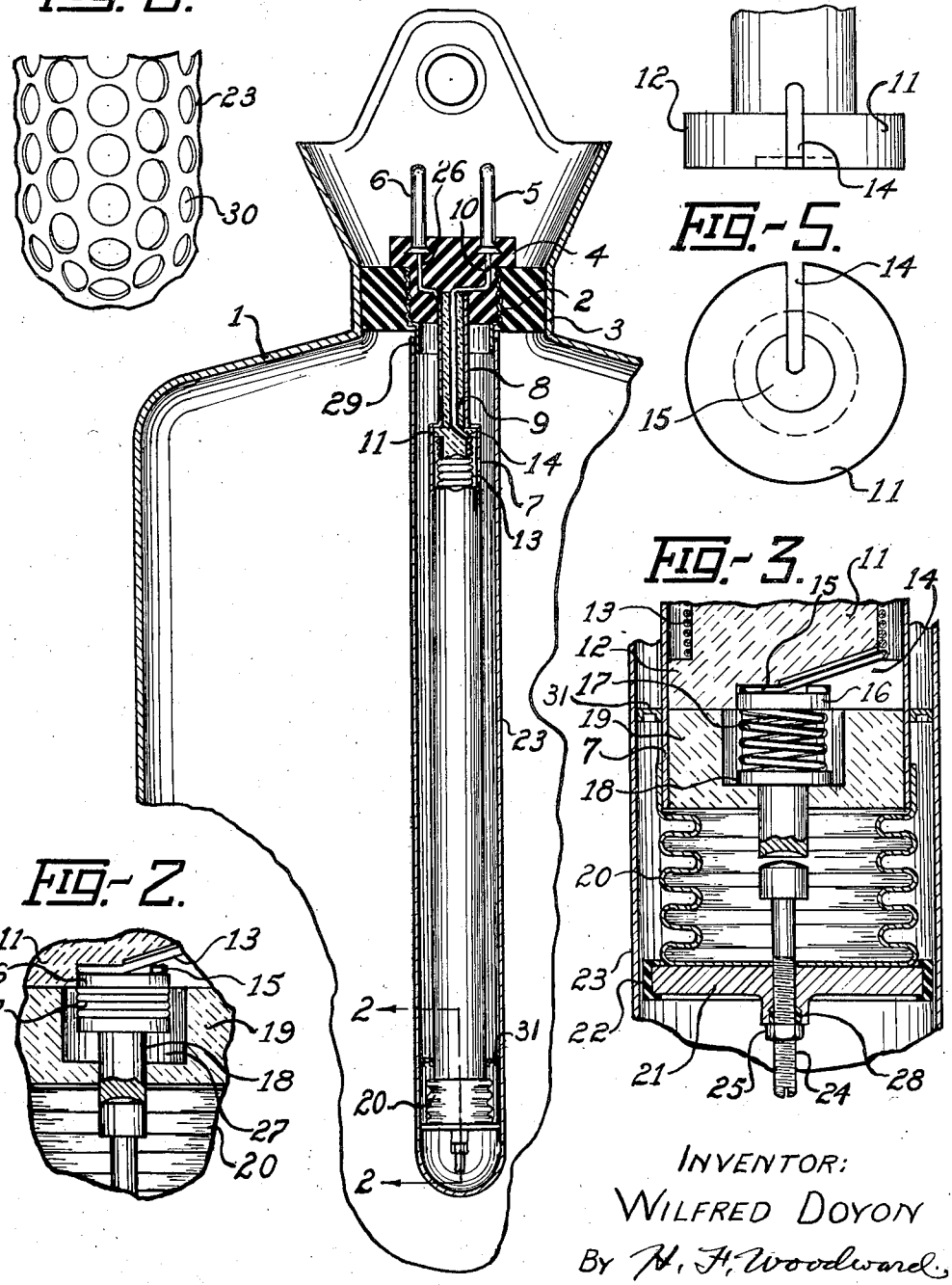
INVENTOR:
WILFRED DOYON
By H. F. Woodward,
ATTORNEY Patented Dec. 15, 1936

2,064,248

UNITED STATES PATENT OFFICE 2,064,248

ELECTRIC HEATING ATTACHMENT FOR HOT WATER BAGS AND THE LIKE

Wilfred Doyon, Detroit, Mich.

Application May 31, 1935, Serial No. 24,428

5 Claims. (Cl. 219—41)

My invention relates to a new and useful improvement in electric heating attachments for hot water bags and the like, of which the following is a full, clear and exact description.

The object of my invention is to provide a hot water bottle heater that will hold the heat at a predetermined temperature as long as the electrical energy is connected thereon.

Another object is to eliminate the heating of the throat and stopper by an especially designed unit.

Another object is to be able to use the same heating unit in a different capacity bottles to conform with the demand in hospitals, homes and sick rooms etc.

A further object is to have a thermostatically controlled switch of a new design being actuated by the water temperature making the device very sensitive and keeping the water at a predetermined heat constantly.

And still a further object is to eliminate the possibility of injuring the bag and element through the medium of a shield over the heating element.

In accomplishing these and other objects of the invention, I have provided improved details of structure, the preferred forms of which are illustrated in the accompanying drawing wherein;

Figure 1 is a sectional view showing my improved electric heating attachment and showing principally the heating element, contacts, thermostat and shield of the device.

Figure 2 shows on an enlarged scale the thermostatic controlled contact points in closed position taken at 2—2 Figure 1.

Figure 3 is the same cross section as at Figure 2 but on a still larger scale showing the contacts in open position.

Figure 4 is a partial view of the lower end of the heating element core showing slot used for lower terminal.

Figure 5 is an end plan view of Figure 4, and

Figure 6 shows a portion of the perforated shield used to protect the element and bottle walls.

Referring to Figure 1 a cross section of a hot water bottle 1 showing a threaded portion 2 securely held into neck 3 of said bottle. Into said portion 2 my heating attachment is threaded into place by means of stopper 4 which is made of insulating material and into which are molded in place terminals 5 and 6. A heating unit 7 of the commercial type is inserted in the lower end of said stopper 4 and it will be noted that the end portion 8 of unit 7 is smaller in diameter and that the heating unit is a certain distance away from the stopper, eliminating the possibility of burning said stopper or injuring it by the heat of said unit. It will also be noted that a small piece of refractory tubing 9 has been provided for the purpose of insulating wire 10 of terminal 5 from the outside shell portion 8 and also reducing the possibility of having intense heat creeping to said stopper 4.

The core of the heating unit is circular in shape and having on both ends a larger diameter somewhat like a flange which serves as a centering point for said core inside of tube 7 and said smaller diameter being used to coil resistance wire 13 as shown at Figure 1. A slot 14 is provided at both ends as shown to allow resistance wire to travel from the coil to the center of unit as shown at 14 Figures 1 and 3.

At the lower end of core 11, a small circular counterbore is provided for the purpose of accommodating the end of resistance wire which is bent in the shape of an eyelet as shown at 15 Figure 3 in order to make a perfect contact to plate 16. Plate 16 is provided for the purpose of acting as a seat for spring 17 which is enclosed into a refractory member 19 as shown and bearing against contact member 18.

On the lower end of unit 7 a thermostatic shell 20 of the commercial type is provided which is securely fastened to unit 7 on one end and having at its other end a plate 21 with a steadyrest member 22 which centers shell 20 in order to have contact points 18 and 24 in alignment at all times. Another steadyrest 31 is provided which holds heating unit central with shield tubing 23 and said plate 21 being securely held to shell 20 as shown, acts as an adapter for contact screw 24 and locknut 25. Shield 23 being perforated as shown at 30 Figure 6 allows the water to contact the heating unit at all points as well as the thermostat.

The operation is very simple, when the electrical energy is turned on, and the water inside is cold, the contacts are joined as shown at Figure 2, the current flows through terminal 5 through wire 10 into coil 13, to plate 16 through spring 17, contact 18, contact 24 then through terminal 6 due to the fact that wire 26 is held securely to the terminal 6 and to outside of unit 7. The adjustment is easily made, if a certain temperature is wanted the contacts are adjusted as shown at Figure 2. That is, shell 20 being in a closed position due to the temperature, forces contact 18 upward against spring 17 leaving a space shown at 27 Figure 2 which allows contacting member 18 to contact member 24 for a period of heating until shell expands far enough to break the circuit. The thermostatic element 20 can be adjusted so that the contacts 24 and 18 will break the circuit at different predetermined temperatures. Contact 24 is screw threaded at its lower end and carries a locknut 25. The locknut 25 can be adjusted up or down on the contact element 24 thereby varying the temperatures at which the thermostat 20 will break the circuit through the contacts 24 and 18. It will be noted that gland 28 is provided for the purpose of stopping water from entering inside of said contact and heating element and it is also understood that all joints pertaining to the heating unit are also water tight. Perforated shield is made to fit snugly over stopper 4 as shown at 29 Figure 1.

Although I have shown and described the preferred form of construction, I do not wish to limit myself to the precise details of the structure shown, but desire to avail myself of such variations and modifications as come within the scope of the appended claims.

What is claimed is:

1. An electric water heater comprising a stopper of insulating material adapted to be inserted in the neck of a hot water bottle and provided with a depending tubular shell extending inwardly from said stopper into the bag, a pair of electrodes molded in the body of the stopper and extending above the stopper to provide spaced terminals, a resistance element spaced in said depending tubular shell and being in circuit with the lower end of one of the said electrodes, the upper portion of the depending tubular shell being smaller in diameter than its lower portion and having the resistance element spaced below the said smaller portion of the depending tubular shell, a contact member positioned in an insulating block at the lower end of said resistance element, a cylindrical thermostatic element attached to the bottom of the depending tubular shell, and the said depending tubular shell being connected to the other electrode, the cylindrical thermostatic element having an adjustable contact member, and the adjustable contact member to be opened and closed at predetermined temperatures.

2. An electric water heater comprising a stopper of insulating material adapted to be inserted in the neck of a hot water bottle and provided with a depending shell portion extending inwardly from said stopper into the bag, a pair of electrodes molded in the body of the stopper and extending above the body of the stopper to provide spaced terminals, a resistance element spaced in said depending tubular shell and in circuit with the lower end of one of the said electrodes, a contact member positioned in an insulating block at the lower end of said resistance element, the said resistance element having a central core portion, and the said core portion extending substantially the length of the depending tubular shell, so that the resistance wire of the resistance element can be wound around the central core portion thereby insuring a greater heating surface, the core portion being provided with slots at its upper and lower ends for aiding in connecting the resistance element with one of the electrodes and the contact member positioned at its lower end, a thermostatic element attached to the bottom of the tubular shell, and the said tubular shell being connected to the other electrode, the thermostatic element having an adjustable contact member adapted to be opened and closed at predetermined temperatures.

3. An electric water heater comprising a stopper of insulating material adapted to be inserted in the neck of a hot water bottle and provided with a depending tubular shell portion extending inwardly from said stopper into the bag, a pair of electrodes molded in the body of the stopper and extending above the stopper to provide spaced terminals, a resistance element spaced in said depending tubular shell, the said resistance element having a central core being flanged at its upper and lower ends to securely hold the resistance wires in place, the said resistance element being in circuit with the lower end of one of the said electrodes, a contact member positioned in an insulating plate at the lower end of the said resistance element, a cylindrical thermostatic element attached to the bottom of the tubular shell and the said tubular shell being connected to the other electrode, and the said thermostatic element having an adjustable contact member adapted to be opened and closed at predetermined temperatures.

4. An electric water heater comprising a stopper of insulating material adapted to be inserted in the neck of a hot water bottle, the said stopper being provided with a depending tubular shell portion extending inwardly from the stopper into the bag, a pair of electrodes molded in the body of the stopper and extending above the stopper to provide spaced terminals, a resistance element spaced in said depending tubular shell and in contact with the lower end of one of the said electrodes, a contact member positioned in an insulating block at the lower end of the said resistance element, the said contact member consisting of an upper and a lower plate and having a spring member spaced between them, a cylindrical thermostatic element attached to the bottom of the tubular shell, and the said tubular shell being connected to the other electrode, the thermostatic element having an adjustable contact member and the adjustable contact member adapted to be in opened and closed position with the contact member positioned at the lower end of the resistance element at predetermined temperatures.

5. An electric water heater comprising a stopper of insulating material adapted to be inserted in the neck of a hot water bottle, the said stopper being provided with a depending tubular shell portion extending inwardly from the stopper into the bag, a pair of electrodes molded in the body of the stopper and extending above the stopper to provide spaced terminals, a resistance element spaced in said depending tubular shell and in contact with the lower end of one of the said electrodes, a contact member positioned in an insulating block at the lower end of said resistance element, a thermostatic element attached to the bottom of the tubular shell, and the said tubular shell being connected to the other electrode, a perforated shield spaced from the said tubular shell and the thermostatic element, the thermostatic element having an adjustable contact member and the adjustable contact member adapted to be in opened and closed position with the contact member positioned at the lower end of the resistance element at predetermined temperatures.

WILFRED DOYON.